(12) United States Patent
Lenhardt

(10) Patent No.: US 6,609,611 B1
(45) Date of Patent: Aug. 26, 2003

(54) DEVICE FOR CONVEYING INSULATING GLASS PANES

(75) Inventor: Karl Lenhardt, Bad Liebenzell (DE)

(73) Assignee: Lenhardt Maschinenbau GmbH, Hamberg (DE)

( * ) Notice: Subject to any disclaimer, the term of this patent is extended or adjusted under 35 U.S.C. 154(b) by 0 days.

(21) Appl. No.: 09/914,892

(22) PCT Filed: Mar. 2, 2000

(86) PCT No.: PCT/EP00/01818
§ 371 (c)(1),
(2), (4) Date: Sep. 4, 2001

(87) PCT Pub. No.: WO00/53879
PCT Pub. Date: Sep. 14, 2000

(30) Foreign Application Priority Data

Mar. 5, 1999 (DE) .......................... 199 09 638

(51) Int. Cl.[7] .................... B65G 15/00; B65G 17/00; B65G 21/20; B65G 39/18; B65G 15/10
(52) U.S. Cl. ................ 198/836.3; 198/626.1; 198/819; 198/817
(58) Field of Search .................... 198/626.1, 626.3, 198/626.5, 817, 819, 836.1, 836.3

(56) References Cited

U.S. PATENT DOCUMENTS

| 4,422,541 | A | * | 12/1983 | Lisec | 198/626.5 |
|---|---|---|---|---|---|
| 4,589,541 | A | * | 5/1986 | Lisec | 198/468.4 |
| 4,615,431 | A | * | 10/1986 | Lisec | 198/468.6 |
| 4,890,714 | A | * | 1/1990 | Brown | 193/35 R |
| 5,280,832 | A | | 1/1994 | Lisec | |
| 5,332,080 | A | * | 7/1994 | Lenhardt et al. | 198/836.1 |

FOREIGN PATENT DOCUMENTS

| DE | 28 16 437 B1 | 8/1979 |
|---|---|---|
| DE | 80 27 173 U1 | 2/1981 |
| DE | 35 29 892 A1 | 2/1986 |
| DE | 42 29 384 C2 | 3/1993 |
| DE | 42 38 254 A1 | 6/1993 |
| EP | 0 225 429 B1 | 6/1987 |
| EP | 0 549 648 B1 | 7/1993 |

* cited by examiner

Primary Examiner—Christopher P. Ellis
Assistant Examiner—Gene O. Crawford
(74) Attorney, Agent, or Firm—Levisohn, Lerner, Berger & Langsam, LLP

(57) ABSTRACT

A device for conveying insulating glass panes, which are slightly inclined from the perpendicular, is provided with a horizontal conveyor (2) on which the insulating glass panes stand, and with a supporting device (150), which extends above and parallel to the horizontal conveyor (2). The supporting device (15) defines by one or more supporting elements a pane movement plan (16) against which rest the insulating glass panes of the horizontal conveyor (2). The horizontal conveyor (2) has two parallel and synchronously drivable conveying elements (7,8), supporting surfaces (10, 11), which are aligned substantially vertical to the pane movement plane (16). The distance of one of the conveying elements (7,8) from the other conveying elements (8,7) is variable. The conveying elements (7,8) are movable independently of one another transverse to the pane movement plane (16).

12 Claims, 2 Drawing Sheets

DEVICE FOR CONVEYING INSULATING GLASS PANES

BACKGROUND OF THE INVENTION

The invention proceeds from a device for conveying insulating glass panes. A device of this type is known from DE 80 27 173 U. Devices of this type are used in that area of production lines for insulating glass panes that handles a semi-finished insulating glass pane composed of two individual glass sheets with insertion between the latter of a spacer frame affixed to the glass sheets. A semi-finished insulating glass pane of this type has an all-round edge gap that is filled with an initially pasty and later hard-setting sealing compound which has the tasks of creating a permanent and strong bond between the individual glass sheets forming the insulating glass pane and of protecting the interior of the insulating glass pane against the ingress of moisture. Thiokols and polyurethane in particular are in use as sealing compound.

For sealing the edge gap of semi-finished insulating glass panes, the production lines contain a sealing station in which the insulating glass panes are sealed by one or more jets which are passed along the sheet edges (DE-C-28 16 427). The device in accordance with the invention is intended above all for use in a sealing station of this type.

The device known from DE-U80 27 173 has a horizontal conveyor with two synchronously driven endless chains arranged parallel to one another and supporting paired and opposite supports and compression blocks. The glass sheets rest with their lower edges on the supports, which only partially grip round the glass sheets from the outer edge side, so that the edge gap remains free. The compression blocks ensure that the glass sheets do not slide down from the supports during conveying and do not slip. To be able to convey glass sheets of differing thickness, one of the conveyor chains is, together with deflection gears around which it passes, movable at right angles to the conveying direction and to the rotation axes of the deflection gears.

To ensure that the glass sheets do not tip over from the horizontal conveyor, a supporting device is provided above the horizontal conveyor, which the glass sheets lean against. In the device known from DE-U-80 27173, a height-adjustable line of supporting rollers supports the glass sheets close to their top edges.

The supports of the known device grip underneath the two individual glass sheets of the insulating glass panes from the outer edge side only partially, thereby leaving free both the edge gap and an strip adjacent to it on the lower edge of the individual glass sheets. This is intended to prevent the horizontal conveyor from picking up any of the pasty sealing compound that has been poured into the edge gap. One drawback of the known device is that the clamping of the glass sheets between the compression blocks can result in splintering at the lower edge of the glass sheet, particularly since the edges of the glass sheets are generally not smooth, but broken and hence irregular. A further drawback is that a sealed insulating glass pane cannot be removed until the clamping effect exerted by the compression blocks has been released by transverse movement of one of the conveyor chains. There is a risk here that the insulating glass pane can slide off the horizontal conveyor.

A considerable advance was achieved with the conveying device known from EP 0 549 648 B1, which has a horizontal conveyor with supporting surfaces on which the glass sheets are conveyed upright. The supporting surfaces are aligned with two planes, are parallel to the conveying direction and form an upward-opening taper. The supporting surfaces, which are preferably designed as toothed belts, support the glass sheets only at the outside of the lower edge of the two glass sheets forming the insulating glass pane. Thanks to the tapered arrangement of the supporting surfaces, the glass sheets tend to center themselves on the horizontal conveyor, which is of advantage for the conveying process. This tendency to self-centering can lead to both glass sheets exerting pressure on the spacer between them. If the spacer is sufficiently strong, which is always the case with spacers formed from metallic hollow sections, there are no problems at all. These problems can however occur in the case of plastic spacers, for example thermoplastic ones, which are not extruded onto one of the glass sheets until immediately before the assembly of the insulating glass pane and first have to set in conjunction with the glass sheets. When these spacers extruded in situ onto a glass sheet are used, the pressure exerted during self-centering onto the spacer can compress the latter and hence reduce the distance between the two glass sheets to less than the required spacing. This danger increases in the case of glass sheets that are thicker and heavier, particularly in the case of laminated glass sheets and glass sheets of structured glass, particularly when these have a sanded bevel at the edge, as this bevel favours drift on the inclined supporting surfaces.

SUMMARY OF THE INVENTION

According to the present invention this object is solved by a device for conveying for conveying insulating glass panes slightly inclined from the perpendicular with a horizontal conveyor on which the glass sheets can stand, and with a supporting device extending above and parallel to the horizontal conveyor and defining a pane movement plane by one or a plurality of supporting elements against which can rest the insulating glass panes standing on the horizontal conveyor, in which the horizontal conveyor has supporting surfaces provided at two parallel and synchronously drivable conveying elements, the supporting surfaces being aligned substantially vertical to the pane movement plane, and the distance between the conveying elements being variable, and in which both conveying elements are moveable independently of one another transversely to the pane movement plane. The invention is also directed to an advantageous method aligning the conveying elements in a device according to the present invention by positioning mutually facing edges of the supporting surfaces flush with the two inner and lower glass edges of the respective insulating glass pane.

This object is solved by a device having the features given in claim 1. Advantageous embodiments of the invention form the subject matter of the sub-claims. Claim 14 relates to an advantageous method for operating the device in accordance with the invention.

In the conveying device in accordance with the invention, both conveying elements are movable independently of one another and transverse to the sheet movement plane. This has crucial advantages:

The width and position of the gap between the supporting surfaces at the rear conveying element (closest to the pane movement plane) on the one hand and the supporting surfaces at the front conveying element (which is at a greater distance from the pane movement plane) on the other hand can be closely adapted to the width and position of the edge gap between the two glass sheets of a insulating glass pane. In DE-U-80 27 173, the distance of the conveying elements can be closely adapted only to the thickness of the insulating glass pane overall.

The two glass sheets of the insulating glass pane can be supported over the entire width of their lower edge, i.e. from the outer edge to the inner edge of the respective glass sheet, leaving free the edge gap defined by the inner edges of the two glass sheets. In the device in accordance with DE-U-80 27 173, the glass sheets could only be under-gripped from the outside by a small dimension, identical for thin, light sheets and for thick, heavy ones. Therefore sheets whose outer edges are ground to a bevel practically cannot be supported and conveyed at all. In the case of the device known from EP 0 549 648 B1, both thin, lightweight glass sheets and thick, heavy ones are supported only at their outer edges. Accordingly, whereas in the case of the conveying devices to the prior art the specific load on the supporting surfaces is very high for thick and heavy glass sheets and can lead to considerable wear, with the conveying device in accordance with the invention the specific load does not increase with the thickness of the glass sheets, the result being that the supporting surfaces of the conveying elements are subjected to much less wear.

Glass sheets can also be conveyed without problem when one or both sheets are bevelled at the outer edge.

During the conveying operation, practically no pressure is then exerted on the spacer.

The device in accordance with the invention can also be used for the conveying of stepped insulating glass panes. Stepped insulating glass panes are units where one of the two sheets is larger than the other, so that it projects beyond the other along at least one edge (see EP 0 549 556 B1). If the larger sheet of the insulating glass pane projects beyond the smaller glass sheet along the lower edge, it can be transported on the conveying device in accordance with the invention if at least one of the two conveying elements, preferably the conveying element nearest the pane movement plane, is adjustable not only transverse to the pane movement plane, but also in its height, ideally parallel to the pane movement plane. The height adjustability of a conveying element is known per se for this purpose from EP 0 549 556 B1, but not in combination with the transversely movable conveying elements. Preferably only one of the conveying elements is height-adjustable, i.e. the conveying element nearest the pane movement plane. Height adjustability for the second conveying element can be dispensed with.

In order to closely match the width and position of the gap between the supporting surfaces at the rear conveying element on the one hand and the supporting surfaces at the front conveying element on the other hand to the width and position of the edge gap of a insulating glass pane, it is necessary to know how thick the rear glass sheet in the pane movement plane is and how wide the edge gap is. The width of the edge gap is also referred to as the sheet intermediate space or air space. In an automated production line for insulating glass panes, these dimensions can be entered in a control unit of the device in accordance with the invention right from the order processing stage, e.g. by a machine-readable coded label affixed to the respective glass sheet and containing these dimensions, which is read by a reader integral to the production line before the glass sheet reaches the conveying device in accordance with the invention, such that the conveying elements can be preset by positioning motors to match the dimensions as read. Instead of obtaining the thickness of the rear glass sheet and the width of the edge gap in advance from a data carrier, these two dimensions can be measured in the insulating glass pane production line in which the device in accordance with the invention is incorporated in keeping with the intended purpose, but also by sensors connected to the control unit of the device in accordance with the invention such that said sensors operate the positioning motors intended for transverse movement of the conveying elements in line with the two dimensions measured of the glass sheet and adjust the conveying elements before the glass sheet enters the device in accordance with the invention.

The conveying elements of the device in accordance with the invention can be of various design. They can be two parallel and horizontal lines of synchronously driven rollers on which stand the two glass sheets of a insulating glass pane. More favourable than supporting surfaces that are in rolling contact with the lower edge of the glass sheet are however supporting surfaces that extend in the horizontal conveying direction and pass with the glass sheets through the conveying device, e.g. a series of horizontal supports attached to an endless chain. The best method is however to use as conveying elements belts whose top part is supported by a carrier. A belt of this type offers the glass sheets the largest possible contact surface and can yet leave the edge gap completely free. Since there is no relative movement between the belts and the glass sheets, there is no concern that the glass sheet can run askew in the course of the conveying operation, as for example would be possible with a roller conveyor. Compression blocks or guide rollers acting from the outside on the glass sheets in order to guide them, and in so doing exerting pressure on the spacer, can be dispensed with in accordance with the invention.

It is advantageous to use a driver device in the form of a suction conveyor belt in the supporting unit, said device extending above and parallel to the horizontal conveyor and being drivable synchronously with the conveying elements. A suction conveyor belt of this type, which is disclosed for example in EP 0 549 548 B1 where it has the task of moving the insulating glass pane dependably over a gap in the horizontal conveyor, i.e. over a gap in which a sealing jet is located to fill the edge gap of the insulating glass pane with sealing compound, is in the scope of the present invention a suitable and advantageous means of keeping the insulating glass pane dependably in the pane movement plane without any pressure being exerted on the spacer as a result.

The carrier has preferably a horizontal upper side aligned substantially at right angles to the pane movement plane, on which upper side the top part of the belt slides. To assure good straight running of the belt, guide means are ideally provided that extend in the predetermined conveying direction, e.g. a flat groove in the top of the carrier in which the belt runs under lateral guidance.

If it is intended to reduce the friction between the belt and its carrier, there is the possibility of providing in the carrier a series of rollers arranged close by each other and with parallel axes and at identical height for supporting the top part of the belt.

In order to achieve slip-free conveying using the belts, the latter are preferably toothed belts with the toothing on the underside that pass around gears, at least one of which is driven.

BRIEF DESCRIPTION OF THE DRAWINGS

Embodiments of the invention are shown in the enclosed diagrammatic drawings.

DETAILED DESCRIPTION

Figure 1:
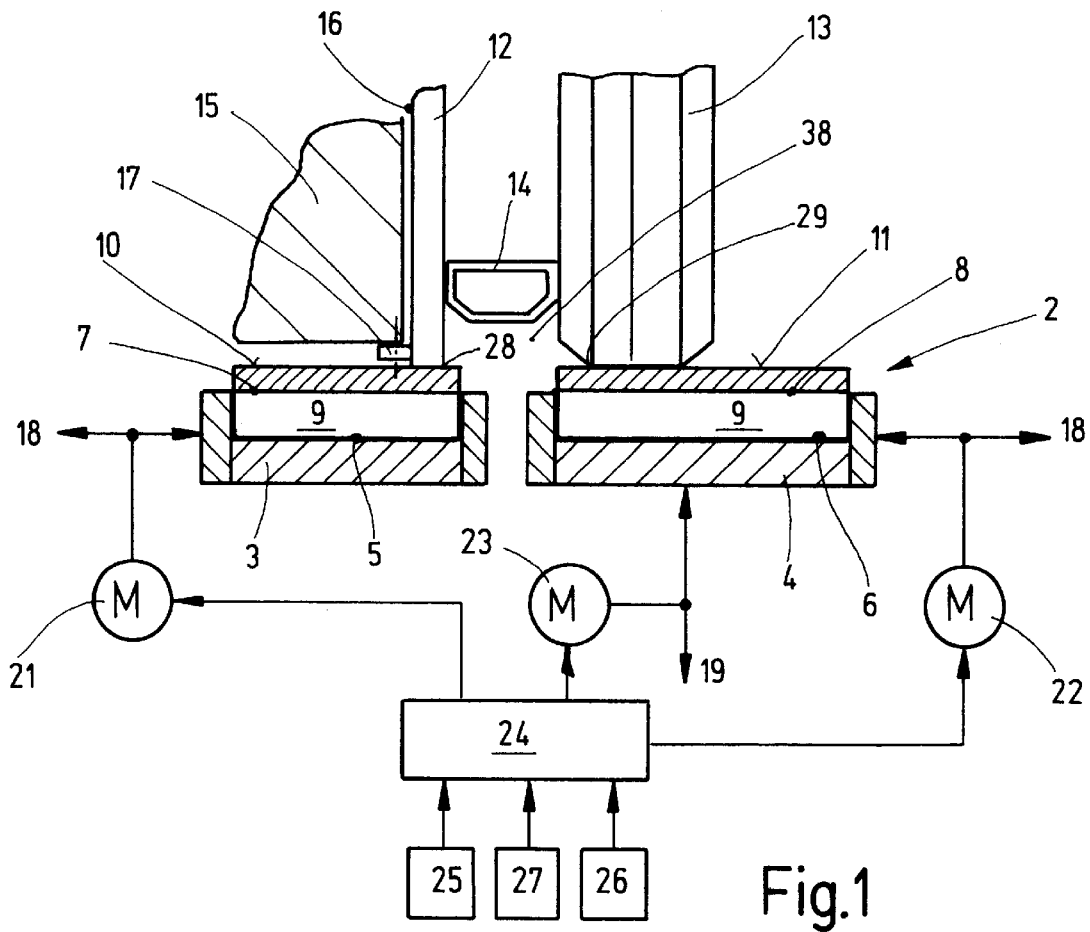
FIG. 1 shows a partial section vertical to the conveying direction through a device for conveying insulating glass panes with an air-cushion wall for lateral support of the glass sheets.

In the various embodiments, identical and corresponding parts are identified with corresponding reference numbers.

The device shown in the figures has a frame to which a horizontal conveyor 2 is attached. The horizontal conveyor comprises two carriers 3 and 4 extending in the conveying direction, on the upper sides of which grooves 5, 6 are provided in which run endless toothed belts 7, 8, the teeth 9 of which are in the grooves 5, 6 and the untoothed upper sides 10, 11 of which act as the supporting surfaces for a insulating glass pane comprising two glass sheets 12 and 13 affixed to one another by means of a spacer frame 14. In the embodiment according to FIG. 1, the spacer frame 14 is made up of a metallic hollow section whose sides facing the glass sheets 12, 13 are coated with an adhesive compound.

The toothed belts 7 and 8 are synchronously drivable and are passed to that end around gears, at least one of which is driven.

Above the carrier 3 with its toothed belt 7 is a supporting wall 15 designed as an air-cushion wall extending parallel to the conveying direction and inclined several degrees to the rear out of the perpendicular. The axes of the gears deflecting and driving the toothed belts 5 and 6 are at right angles to the air-cushion wall 15. The same applies for the upper part of the toothed belts 5 and 6.

The front side of the air-cushion wall 15 against which the insulating glass pane leans defines, together with free-running supporting rollers 17 attached to the bottom edge of the air-cushion wall 15 and projecting slightly beyond its front side by with their running surfaces, a pane movement plane 16 in which the outside of the rear glass sheet 12 is positioned during conveying.

The two carriers 3 and 4 are movable independently of one another by electric positioning motors 21, 22 vertical to the front side of the air-cushion wall 15 and hence substantially vertical to the pane movement plane 16, as indicated by the horizontal double arrows 18. At least one of the carriers, in the case of FIG. 1 carrier 4, is furthermore also adjustable parallel to the front of the supporting wall 15 and is hence height-adjustable substantially parallel to the pane movement plane 16 by means of an electric actuator 23, indicated in FIG. 1 by the double arrow 19.

The positioning motors 21, 22 for the approximately horizontal movement of the carriers 3, 4 and the actuator 23 for height adjustment of the carrier 4 are controlled by a control unit 24 which in turn receives signals from sensors 25, 26, 27, one of which, for example sensor 25, measures the thickness of the rear glass sheet 12, another, for example sensor 26, measures the distance between the glass sheets 12 and 13, and the other, for example sensor 27, measures the height of the glass sheets 12 and 13. From the measurement signals of the sensors 25, 26 and 27, the control unit 24 forms setting signals for the positioning motors 21 and 22 for the actuator 23. Accordingly, the positioning motor 21 moves the carrier 3 such that the edge of the toothed belt 7 projecting beyond the air-cushion wall 15 is flush with the inner edge 28 of the rear glass sheet 12. The positioning motor 22 moves the carrier 4 such that the edge of the toothed belt 8 facing the air-cushion wall 15 has a distance from the opposite edge of the toothed belt 7 that matches the distance of the glass sheets 12 and 13 or has a distance slightly larger, the latter in particular when the thicker glass sheet 13 has, due to bevelling of the lower edge, a receding edge 29 there to which the edge of the toothed belt 8 is then preferably set. From the height measurement by the sensor 27, the control unit 24 can deduce whether a stepped insulating glass pane is coming, and if so how high the step is. The actuator 23 then moves the carrier 4 by the height of this step. In the case of stepped insulating glass panes made from glass sheets of differing thickness, the thicker glass sheet is generally the larger one. In this case, the actuator 23 would move the carrier 4 downwards.

Figure 2:
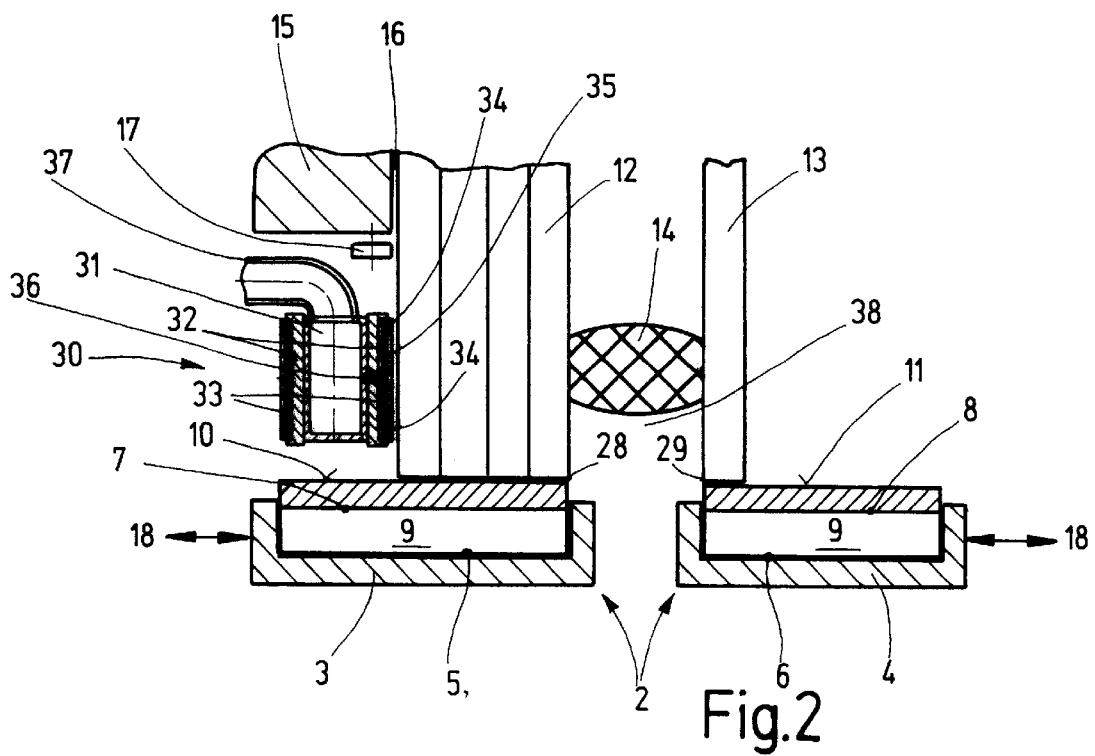
FIG. 2 shows a variant of the device represented in the same way as in FIG. 1.

The embodiment shown in FIG. 2 differs from that in FIG. 1 in that the insulating glass pane has a plastic spacer instead of a metallic spacer 14, and in that in a recess of the air-cushion wall 15 a driver device 30 is provided that has a hollow beam 31 extending parallel to the conveying direction and having on its front and rear sides in each case a guide rail 32 in which runs a belt 33 from whose front side flat and open chambers are formed by longitudinal strip-like raised sections 34 and webs 35 running from top to bottom and connecting said raised sections, said chambers being able to be covered by the insulating glass pane. These flat chambers are connected via holes 36 in the belt 33 and in the beam 31 with the interior of the latter, and the interior is connected via a suction pipe 37 to the suction side of a blower, creating negative pressure in the cavity between the belt 33 and the insulating glass pane. Other suction conveyor belts usable for the purpose are described in DE 35 29 892 A and in EP 0 225 429 C.

In this case, the pane movement plane is defined by the front sides of the driver device 30 and the air-cushion wall 15, which jointly support the insulating glass pane at the rear.

The driver device 30 ensures that the insulating glass pane remains with the outside of its rear glass sheet 12, in this case a thicker laminated glass sheet, in the pane movement plane; this type of guidance of the insulating glass pane generates no pressure whatsoever on the plastic spacer 14.

In order to convey stepped panes too, the carrier 3 is in this case height-adjustable. Furthermore both carriers are, as in the first embodiment, adjustable approximately horizontally.

Figure 3:
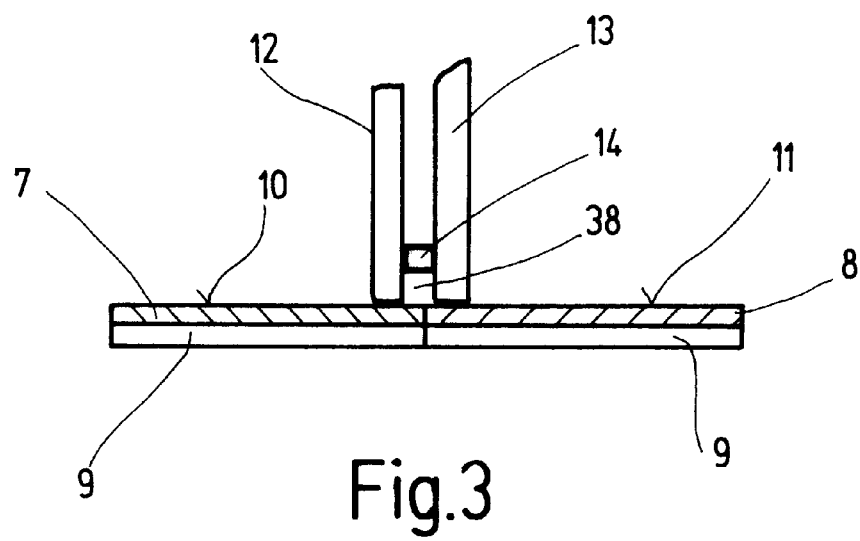
FIG. 3 shows a device as in FIG. 1 or FIG. 2 with conveying elements that are moved as near to one another as possible.

If the lower edge gap 38 of the insulating glass pane does not contain fresh sealing compound, the two toothed belts 7 and 8 do not have to leave the edge gap 38 free, and instead can cover it, as shown in FIG. 3. The two conveying elements 7 and 8 can then assume their lowest possible distance apart, as shown in FIG. 3. An arrangement of this type is suitable for the entry side of an automatic sealing unit in a insulating glass pane glass production line. The entry side of the automatic sealing unit is designated as that section of the automatic sealing unit in front of the sealing jet of the automatic sealing unit in respect of the conveying direction. On the outlet side of the automatic sealing unit, i.e. in that section after the sealing jet in respect of the conveying direction, the conveying elements are set such that they leave the edge gap 38 free. On the entry side of the automatic sealing unit, the positioning motors 21 and 22 for the approximately horizontal movement of the carriers 3 and 4 can furthermore be dispensed with.

Figure 4:
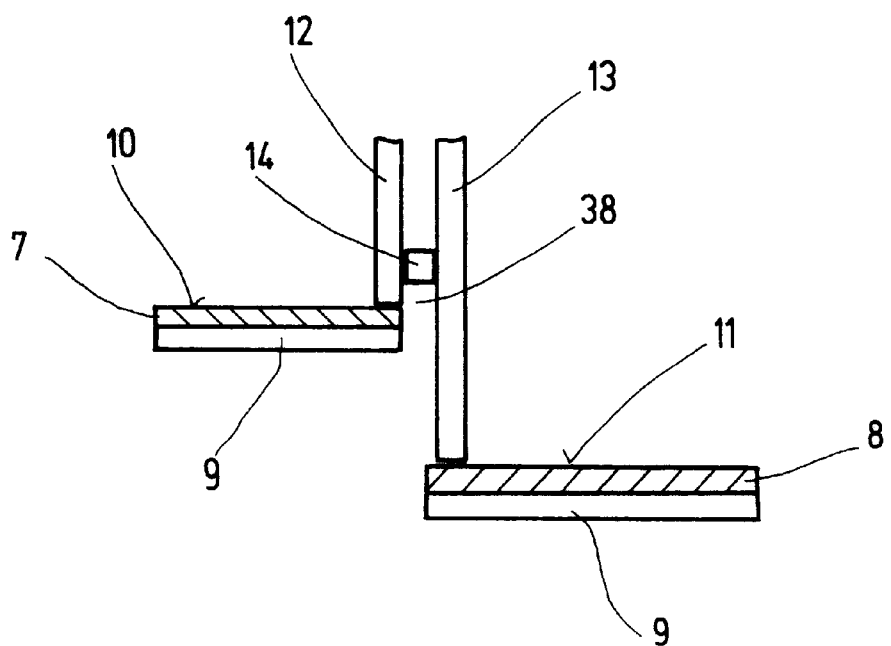
FIG. 4 shows in the same representation as in FIG. 1 the position of the conveying elements during conveying of stepped panes.

FIG. 4 shows in a device according to FIG. 1 or FIG. 2 the arrangement of the conveying elements 7 and 8 during conveying of stepped insulating glass panes. For that purpose, either the carrier 4 was lowered (FIG. 1) or the carrier 3 raised (FIG. 2). The lower conveying element 8 does not in this case have to be flush with the inner edge of the outer glass sheet 13, since it is in any case at a greater distance from the edge gap 38 because of the step of the insulating glass pane.

What is claimed is:

1. A device for conveying insulating glass panes slightly inclined from the perpendicular with a horizontal conveyor on which the insulating glass panes stand, and with a supporting device extending above the parallel to the horizontal conveyor and defining a pane movement plane by one or a plurality of supporting elements against which rest the insulating glass panes standing in the horizontal conveyor, in which the horizontal conveyor has supporting surfaces on two parallel and synchronously drivable conveying elements, the supporting surfaces being aligned substantially vertical to the pane movement plane, and the distance between the conveying elements being variable, wherein both conveying elements are movable independently of one another transversely to the pane movement plane.

2. The device according to claim 1, in which at least one of said conveying elements is also height-adjustable.

3. The device according to claim 1, in which electric positioning motors are provided for movement of said conveying elements, to which motor sensors are assigned that measure the thickness of the glass sheet, which runs in said pane movements plane, and the distance between the to glass sheets in said insulating glass pane such that the positioning motors adjust said conveying elements in accordance with the measurement values obtained.

4. The device according to claim 1, in which an electric actuator is provided for height adjustment of the at least one conveying element, to which a drive sensor is assigned that measures how high the step between the two glass sheets of said insulating glass panes is in a possibly arriving step pane, such that the actuator changes the height position of the appropriate element by the dimension of the step measured.

5. The device according to claim 1, which in the area of said supporting device, a driver is arranged that is driven synchronously with the horizontal conveyor and creates a non-positive connection to the glass sheet through suction.

6. The device according to claim 1, in which said supporting surfaces extend in the horizontal conveying direction.

7. The device according to claim 6, in which said conveying elements are belts whose top part is supported by a carrier.

8. The device according to claim 7, in which said carrier has a series of rollers arranged close by each other and with parallel axis and identical heights, which support the top part of said belt.

9. The device according to claim 7, in which said belts are toothed belts.

10. The device according to claim 7, in which said carrier has an upper side aligned horizontally and substantially at right angles to the pane movement plane, the top part of said belt sliding on the upper side of said carrier.

11. The device according to claim 10, in which said carrier has guide means that guide said belt in the conveying direction.

12. The device according to claim 11, in which said guide means are formed by a groove, in the upper side of said carrier.

* * * * *